United States Patent
McManus

(10) Patent No.: US 6,826,626 B1
(45) Date of Patent: Nov. 30, 2004

(54) METHOD OF AND APPARATUS FOR RAPID RETRIEVAL OF DATA IN A CONTENT DISTRIBUTION NETWORK

(75) Inventor: Patrick Raymond McManus, Waltham, MA (US)

(73) Assignee: Clear Blue Technologies Management, Inc., Syracuse, NY (US)

( * ) Notice: Subject to any disclaimer, the term of this patent is extended or adjusted under 35 U.S.C. 154(b) by 499 days.

(21) Appl. No.: 09/621,659

(22) Filed: Jul. 21, 2000

(51) Int. Cl.$^7$ .............................................. G06F 15/16
(52) U.S. Cl. ...................................... 709/246; 707/101
(58) Field of Search .............................. 709/247, 219, 709/217, 201, 246; 711/100; 707/101

(56) References Cited

U.S. PATENT DOCUMENTS

| | | |
|---|---|---|
| 5,305,195 A | 4/1994 | Murphy .......................... 705/1 |
| 5,321,740 A | 6/1994 | Gregorek et al. ......... 379/88.22 |
| 5,428,670 A | 6/1995 | Gregorek et al. .......... 379/67.1 |
| 5,557,658 A | 9/1996 | Gregorek et al. ........ 379/88.25 |
| 5,737,619 A | 4/1998 | Judson |
| 5,860,071 A | 1/1999 | Ball et al. |
| 5,898,836 A | 4/1999 | Frievald et al. |
| 5,931,904 A | 8/1999 | Banga et al. |
| 6,021,426 A | 2/2000 | Douglis et al. |
| 6,047,313 A | 4/2000 | Hashimoto et al. |
| 6,061,686 A | 5/2000 | Gauvin et al. |
| 6,065,044 A | 5/2000 | Ogasawara |
| 6,073,168 A | 6/2000 | Mighdoll et al. |
| 6,178,461 B1 * | 1/2001 | Chan et al. .................. 709/247 |
| 6,237,060 B1 * | 5/2001 | Shilts et al. ................ 711/100 |
| 6,457,047 B1 * | 9/2002 | Chandra et al. ............ 709/217 |
| 6,510,458 B1 * | 1/2003 | Berstis et al. ............... 709/219 |

FOREIGN PATENT DOCUMENTS

EP          1016987 A      7/2000

OTHER PUBLICATIONS

Banga et al., "Optimistic Deltas for WWW Latency Reduction", pp. 1–15, 1997.*

Jeffrey C. Mogul, "What is HTTP Delta Encoding", Nov. 14, 2000.*

(List continued on next page.)

*Primary Examiner*—Zarni Maung
*Assistant Examiner*—Jungwon Chang
(74) *Attorney, Agent, or Firm*—Potomac Patent Group, PLLC

(57) ABSTRACT

A method of and apparatus for accelerating data retrieval on a widely dispersed content distribution network such as the World Wide Web. The system associates a concept URI with a resource which can then serve as a reference for a group of resources. When the system receives a request from a client calling for a resource in this group, it prepares a delta encoded responses based on the difference between the reference document and the response it has obtained from an origin server (the identity response). The system then sends the client the delta encoded response, an identification of the reference document used to prepare the delta encoded response, and an address where the reference document may be obtained if a client does not already have a copy. A client either decodes the information from the system by reconstituting the response using the delta encoded response and the reference if it already has a local copy, or, if it does not already have a local copy, using the address to retrieve a local copy and then carrying out the decoding. The selection of a reference is based on heuristics. The system also has the capability of changing which resource it will use as a reference based on the performance of the reference, i.e., whether the reference has continued to produce acceptably small deltas. The reference may be a version of an actual resource, or created by the system to serve the group of resources as a reference.

35 Claims, 4 Drawing Sheets

OTHER PUBLICATIONS

Guarav Banga, Fred Douglis & Michael Rabinovich, *Optimistic Deltas for WWW Latency Reduction*, 1997, pp. 1–15.

Anja Feldmann, Ramón Cáceres, Fred Douglis, Gideon Glass & Michael Rabinovich, *Performance of Web Proxy Caching in Heterogeneous Bandwidth Environments*, pp. 1–10.

David Korn and Kiem–Phong Yo, *The VCDIFF Generic Differencing and Compression Data Format*, Mar. 2000, pp. 1–37.

Jeffrey C. Mogul, Fred Douglis, Anja Feldmann & Balachander Krishnamurthy, *Potential benefits of delta encoding and data compression for HTTP*, 1997, pp. 181–194.

Jeffrey Mogul, Balachander Krishnamurthy, Fred Douglis, Anja Feldman, Yaron Goland & Arthur van Hoff, *Delta encoding in HTTP*, Mar. 2000, pp. 1–60.

Michael Rabinovich, *Issues in Web Content Replication*, pp. 1–9.

Ben Smith, Anurag Acharya, Tao Yang & Huican Zhu, *Exploiting Result Equivalence in Caching Dynamic Web Content*.

Craig E. Wills & Mikhail Mikhailov, *Exploiting Object Relationships for Web Caching*, Oct. 1999, pp. 1–16.

*HTTP: Delta–Encoding Notes*, Jan. 1997, pp. 1–12.

Housel et al., "WebExpress: A client/intercept based system for optimizing Web browsing in a Wireless Environment", Mobile Network and Applications 3, vol. 3, No. 3, 1998, pp. 419–431.

Douglis et al., "HPP:HTML Macro Preprocessing to Support Dynamic Document Caching", Proceedings of the Usenix Symposium on Internet Technologies and Systems, Dec. 1997, pp. 83–94.

S. Williams, "HTTP: Delta–Encoding Notes", Internet, Jan. 17, 1997.

PCT International Search Report dated Nov. 25, 2002 for PCT/US01/22075.

* cited by examiner

METHOD OF AND APPARATUS FOR RAPID RETRIEVAL OF DATA IN A CONTENT DISTRIBUTION NETWORK

FIELD OF THE INVENTION

This invention relates to the field of data retrieval in a content distribution network, and, in particular to data retrieval as it pertains to retrieving data through a geographically dispersed content distribution network such as the World Wide Web.

BACKGROUND OF THE INVENTION

Users of the World Wide Web obtain data on the web through HTTP transactions. Each HTTP transaction consists of a request originated by a user client and a response originated by a server containing the resource which includes the desired information. The request typically indicates the entity being sought, various parameters about what types of responses are acceptable, and, under some styles of requests, the request also includes client-supplied input data. A successful response contains a message indicating the identity of the requester and some informational headers about that response.

The entity (either the request entity or response entity, but typically only the response entity) may be encoded in a fashion that is compliant with the capabilities of the receiving end of the connection as typically indicated in the request. More than one encoding may be applied so long as the order of application is preserved. An entity with no encodings on it is said to have the identity encoding.

The HTTP architecture defines three basic components: user agents, origin servers, and proxies. This architecture is shown in FIG. 1. The user agent 20 and the origin server 30 form the ends of the chain which may contain any number of proxies 40 as the middle links. One of ordinary skill in the art will understand that the user agent 20 is Internet interface user software such as Microsoft Explorer or Netscape running on a suitable computer. The dots in FIG. 1 are intended to show that it is possible that there are several proxies in the chain extending from the user agent 20 to the origin server 30. Under some circumstances, an individual caching proxy may "stand in" for the origin server, thus shortening the chain and improving performance by increasing locality.

A complete HTTP session that encompasses all of the network elements in the transaction is known as an "end-to-end session." An individual leg of that session (e.g., from user agent 20 to proxy 40, between two intermediate proxies 40, or between a proxy 40 and the origin server 30) is known as a "hop." The terms HTTP end-to-end and HTTP hop-to-hop are similar in concept to the IP terms of the same names but an end-to-end HTTP session may certainly contain multiple end-to-end IP sessions, and HTTP hops consist of exactly one IP end-to-end session, but may include multiple IP hops.

In conventional usage, and as the term "client" is used herein, any element creating upstream traffic (the traffic carrying the request) is said to be a client. Similarly, in conventional usage, and as the term "server" is used herein, any element creating response-bearing traffic is said to be a server. Thus, in any chain which includes more than just the end elements there are multiple clients and multiple servers. For example, for a request originated by the user agent 20 and relayed to the first proxy 40, the user agent 20 acts as the client. The first proxy 40 then acts as a client for the next proxy 40, and so on. Some protocol features may be introduced by any client or server while some may be introduced only by the user agent 20 and/or the origin server 30 at the chain's end points. Protocol features which may be introduced by any client or server are referred to as hop-to-hop features and apply only to a single link of the chain. Protocol operations that may be negotiated only at the end points of the chain are called end-to-end features. These may not be modified by any intermediate proxy although they may be created by a proxy under some circumstances.

Traditional proxy environments focus on using large cache networks to replicate popular data and bring it closer (in terms of network distance) to the user agent 20 that is requesting it. Each proxy 40 has an associated cache. There are circumstances where a proxy 40 may already have in its cache fresh, valid data which would constitute a valid response to the request. In such circumstances, known as a "cache hit", the proxy can respond to the request without having to forward the request further along to the chain to the origin server 30. One potential advantage of traditional proxy environments is reduced latency because the data is closer to the client when served from a cache than when obtained from the origin server 30. Thus the response time is improved. A second potential advantage is increased object availability. Because the data needs to traverse only a smaller number of network links when served from cache, the probability of any link in the total transaction being down is reduced. A third potential advantage is reduced bandwidth requirements. Obviously, if the response does not need to traverse all the links to the origin server 30 then some bandwidth can be saved.

While traditional caching proxy strategies are widely deployed on the Internet today and can confer all of these potential benefits, they generally do not implement any efficiency-oriented transfer encodings. The traditional approaches concentrate on reducing byte count by having proxies which can reuse and/or re-validate fresh documents they have stored on disk. This limits their efficacy to primarily static content environments. Most images and a substantial amount of hand-created markup documents fall into this category. These entities typically do not change between requests except at very long intervals.

There is, however, another type of content frequently encountered on the Web, that being dynamic content. Documents created or altered by an origin server on demand in response to requests are considered dynamic documents. They change very often, if not on every request, and are served with information prohibiting traditional caches from using them in answer to subsequent requests. An example of a dynamic document is, for example, a stock quote server. This type of data is traditionally neglected by existing strategies, but benefits the most from a strategy known as differential encoding or delta encoding.

In traditional delta encoding, a fresh response to a request is compared against an older version of the response and only the difference is sent. This ideally avoids having to resend the entire resource in response to every request. While conventional delta encoding schemes can work well in many circumstances, their actual or proposed implementation does have potential drawbacks. One prominent potential drawback is an excessive proliferation of older versions of the resource in caches throughout a system, especially for resources which change often. Also, most delta encoding schemes are end-to-end schemes. They thus cannot achieve their full potential in circumstances where the most appropriate encodings available on any of the links may not be understood by both end points. In these scenarios the capabilities which the transaction can exploit are limited to the best common capabilities of the end points. Another potential drawback with some implementations of a differential encoding scheme is that they require modification of the one or both of the end points of the chain.

There thus remains in need for a system which can introduce efficiencies in the handling of dynamic data in a proxied environment. At the same time, it is useful for such a system to be transparent to the end points and be able to take advantage of the encoding capabilities of the proxies rather than being limited to the encoding capabilities of the end points. In fact, it is useful to have a system in which no modifications to the endpoints (user agent and origin server) are necessary to achieve increased speed and efficiency.

SUMMARY OF THE INVENTION

These and other ends are achieved in the present invention through its provision of a method of and an apparatus for retrieving data in a content distribution network.

More particularly, the invention resides in a method of retrieving data over a content distribution network wherein a client sends a request for data for a resource. A server responsively connected to the client receives the request for data sent by the client. The server then identifies a reference for an identity response to the request, and then compares the reference with the identity response to the request for data to generate a delta encoded response based on differences between the identity response and the reference. The server then sends the delta encoded response and an identification of the reference to the client. The client reconstitutes the identity response using the delta encoded response and a locally stored copy of the reference if the client has previously stored a copy of the reference. Otherwise the client retrieves a copy of the reference and then reconstitutes the identity response using the delta encoded response and the retrieved copy of the reference In another aspect of the invention, the server identifies the reference for the identity response by identifying a reference having a URI which matches a truncated URI for the identity response.

In another aspect of the invention, the server stores an indication of a size of the delta encoded response generated by a given reference each time the reference is used to obtain a series of sizes of delta encoded responses generated by the given reference. The server keeps at least one running weighted average using the series of delta encoded responses and can substitute a new reference for the given reference based at least in part on the at least one weighted average.

In yet another aspect of the invention, the delta encoded response is generated based on a string substitution using the reference as a dictionary for the delta encoded output and using variable length references to strings in the reference and raw echo includes of non-replicated information from the identity response.

In addition to sending the delta encoded response and an identification of the reference to the client, the server may also send an address where the reference may be found and keep the reference available for a predetermined period of time after sending the identification of the reference and the address to the client.

In another aspect, the method of retrieving data over a content distribution network includes a step, performed by a server after serving a resource in a previous transaction, of making a concept URI for that resource and treating it as a reference. Then, in a subsequent transaction, when a client sends a request for data for a resource to the server, the server compares the concept URI with the URI of an identity response to the request for data. If the concept URI and the URI of the identity response partially match, the server generates a delta encoded response based on differences between the identity response and the reference and sends the delta encoded response and an identification of the reference to the client. The client then reconstitutes the identity response using the delta encoded response and a locally stored copy of the reference if the client has previously stored a copy of the reference. Otherwise, the client retrieves a copy of the reference and then reconstitutes the identity response using the delta encoded response and the retrieved copy of the reference In the context of a system having a generic user agent seeking a resource from a given origin server, the user agent sends a request for data for a resource. An entry proxy arranged to receive the request from the user agent relays the request to a return engine together with an indication that the entry proxy can perform an encoding. The return engine obtains an identity response to the request from the origin server. The return engine than uses a reference it has associated with the identity response to generate a delta encoded response based on differences between the identity response and the reference. The return engine sends the delta encoded response and an identification of the reference to entry proxy. The entry proxy then reconstitutes the identity response using the delta encoded response and a locally stored copy of the reference if the entry proxy has previously stored a copy of the reference. Otherwise the entry proxy retrieves a copy of the reference from the return engine and then reconstitutes the identity response using the delta encoded response and the retrieved copy of the reference. The user agent then sends the reconstituted response to the user agent which requested it.

The invention also resides in an apparatus for retrieving data over a content distribution network. The apparatus comprises a client adapted to send a request for data for a resource and a server, responsively connected to the client, and arranged to receive the request for data sent by the client. The server includes means for identifying a reference for an identity response to the request, means for comparing the reference with an identity response to the request for data to generate a delta encoded response based on differences between the identity response and the reference; and means for sending the delta encoded response and an identification of the reference to the client. The client includes means for reconstituting the identity response using the delta encoded response and a locally stored copy of the reference if the client has previously stored a copy of the reference, otherwise for retrieving a copy of the reference and then reconstituting the identity response using the delta encoded response and the retrieved copy of the reference.

BRIEF DESCRIPTION OF THE DRAWINGS

These and other features and aspects of the invention can be more clearly understood from the accompanying drawings, in which.

DETAILED DESCRIPTION

Figure 1:
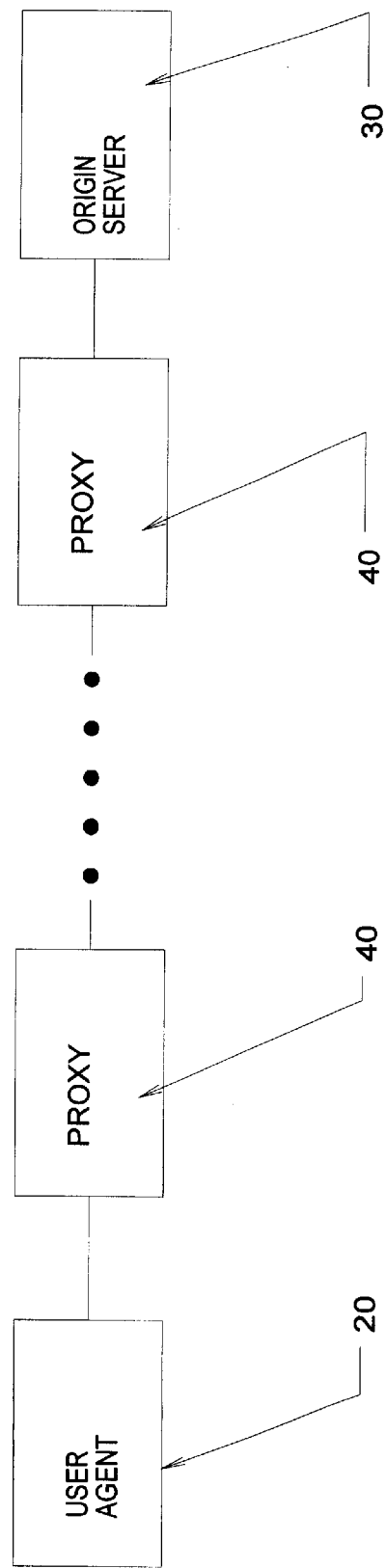
FIG. 1 is functional block diagram of a conventional content distribution network.

In a system according to the invention, a server/proxy may associate a "reference entity" (also called "reference document" or simply "reference" herein) with a one or more resources. When such a proxy in the system receives a request from a client calling for one of these resources, the proxy prepares a delta encoded response (or simply "delta") based on the difference between the reference document and the identity response the proxy has obtained from an origin server. The proxy then acts as a server and sends the delta to the user agent/client, as well as an identification of the reference document the proxy used to prepare the delta. The proxy/server may also send the address of the reference entity, and be configured to keep the reference entity available for a predetermined period of time. The client receiving the information either reconstitutes the response using the delta and the reference if the client already has a local copy, or, if the client does not already have a local copy, by using the address supplied by the proxy/server to retrieve a copy from the proxy/server and then carrying out the decoding/reconstitution process.

The reference, generally speaking, is a resource which has previously been served by the system. The original selection of a resource to serve as a reference document may be based on any acceptable method. In general, the reference document is selected and/or created heuristically. The presently preferred method is to assign the reference a concept URI which is a truncated version of its original URI, and then use the reference for resources whose URI, when truncated, match the concept URI. The system also has the capability of changing which reference it will use based on the performance of the reference, i.e., whether the reference has continued to produce acceptably small deltas. The reference may be a version of an actual resource, or a specially created to serve a given group of resources as a reference. It is not selected to contain only data known to be static.

The present invention also takes advantage of the ability to define encodings hop-to-hop. This permits it to exploit capabilities which may be available within a chain of proxies but which may not be available at either end of the chain. It is presently envisioned that the system will make use of header parameters already existing in the HTTP/1.1 protocol such as Transfer Encoding and TE. These are used to indicate capabilities and transformations that have been and can be, respectively, applied to an HTTP hop. A transaction can be carried out using a smaller number of bytes transported when the Transfer Encoding and TE headers can be used. In this fashion, the user agent need not be aware of techniques (delta encoding, compression) that may have been applied to the data en route but undone before receipt. Because the proxy is close to the user agent in comparison with the network distance between the user agent and origin server, however, a large benefit can be achieved.

This feature of the invention also makes it transparent to the end points of the chain. Because all of the transmission facilitation techniques can be applied and undone after the message leaves or before it reaches the end points, content providers do not need to alter content, nor do content requesters need to alter the formats of their requests. Also, there is no need to alter the manner of operation of the user agent or the origin server to enable the system to work.

These advantages can be even more pronounced when differential encodings or delta encodings are used in conjunction with a hop-to-hop encoding scheme. Various differential encodings can be used. They encode a message in fashion so that it includes only the differences between the response entity and another entity. In the case of the presently preferred embodiment of the invention, the basis for comparison (the entity against which the identity response is compared) is the reference entity. In a presently preferred embodiment of the invention, the differential encoding used is based on a string substitution which uses of the reference entity as a dictionary for the encoded output using only variable length references to strings in the reference document and raw echo includes of non-replicated information from the entity being encoded. The algorithm implementation operates in fixed memory resources in time linearly proportional to the document size. Because the resource requirements do not vary with the size or complexity of the document, the algorithm has determinable bounds that make a suitable for high volume transaction environments.

Figure 2:
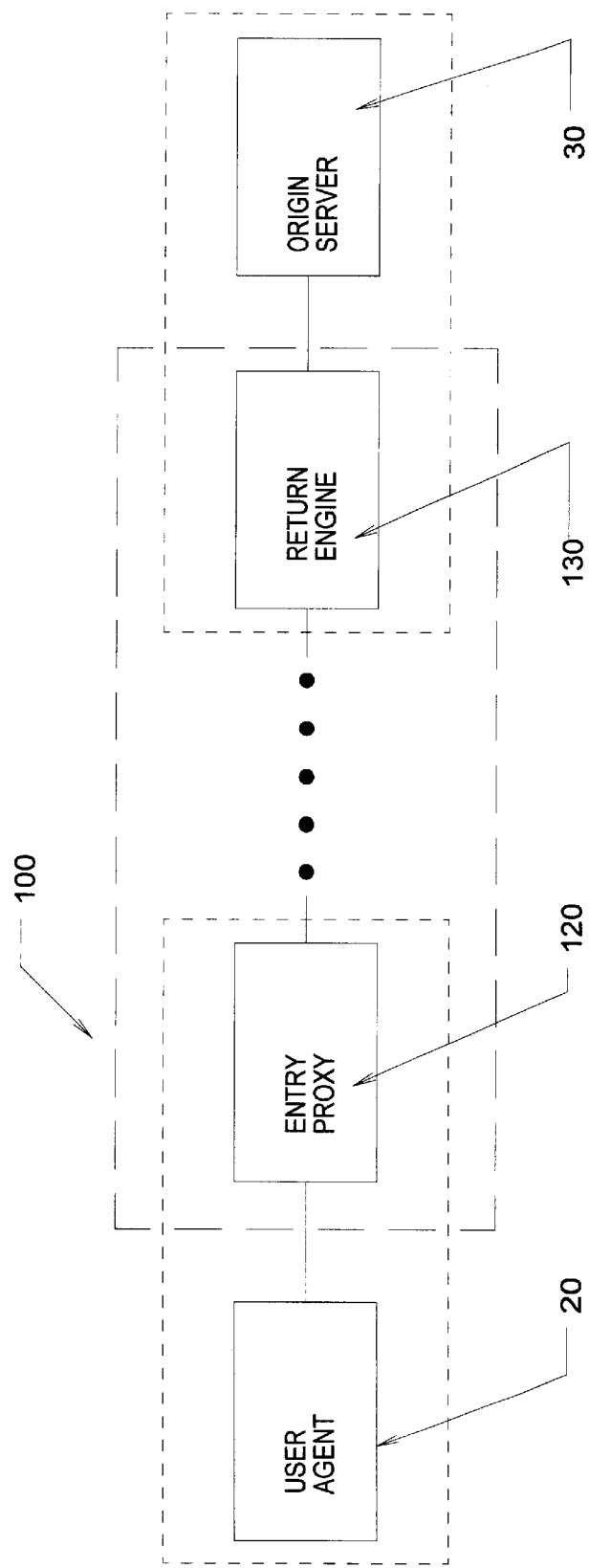
FIG. 2 is a functional block diagram of an embodiment of system according to the present invention.

These and other aspects of the invention can be better understood in connection with FIG. 2, which is a functional block diagram of one embodiment of a system according to the invention. In FIG. 2, the system is shown as a group of elements within the dashed line box generally designated by numeral 100. It will be understood by one of ordinary skill the art of that these elements may be and probably are physically remote from one another. The system 100 resides between a user agent 20 and an origin server 30 (using like numerals to designate like elements from FIG. 1). The dots in FIG. 2 again show that the path the request takes from entry proxy 120 to return engine 130 may be direct (i.e., no intervening proxies), may pass through a series of proxies within the system 100 as represented by the series of dots in FIG. 2, or may pass through proxies not within the system 100 before reaching the return engine 130. In general, however, the path will be as explicitly shown—from user agent 20 to entry proxy 120 to return engine 130 and to origin server 30, if necessary.

One of ordinary skill in the art will again understand that the user agent 20 is Internet interface user software such as Microsoft Explorer or Netscape running on a suitable computer. One of ordinary skill in the art will also understand that an entry proxy is a proxy performs the any of the functions ascribed to the entry proxy herein, and that a return engine is a proxy which performs any of the functions ascribed to the return engine herein.

The user agent 20 first queries the system 100 for an address for a resource using standard DNS methods. Rather than returning the address for the resource, however, the system 100 returns an address for a proxy acting as entry proxy 120 which is a proxy or "surrogate" selected by the system 100 as the optimal entry proxy to be used by user agent 20 for the request. This selection is typically based at least in part on physical proximity of the user agent 20 to the entry proxy 120 as indicated by the dashed box around these two elements. In this connection, it will be understood that the term "physical proximity" could embrace distances of hundreds of miles. What is significant is that the entry proxy 120 is closer than the origin server 30 in terms of network distance.

A consequence of this manner of operation is that as far as user agent 20 is concerned, the address which has been returned to it by the system 100 is the address for the ultimate resource it originally requested. The user agent 20 is unaware that it has been given the address of a surrogate. Thus, in a system according to the invention there is no need for *a priori* designation (explicit addressing) of the entry proxy 120 within the user agent 20.

Once it receives the address from the system 100, the user agent 20 sends its request to the entry proxy 120. Any one of several things can happen at this point.

First, the user agent 20 may have included a header in the request (such as IF NONE MATCH) indicating a resource it has already cached. If the entry proxy 120 knows the resource cached by the user agent 20 is still valid, it simply sends the user agent 20 a message indicating that the user agent 20 is free to use the cached resource.

Figure 3:
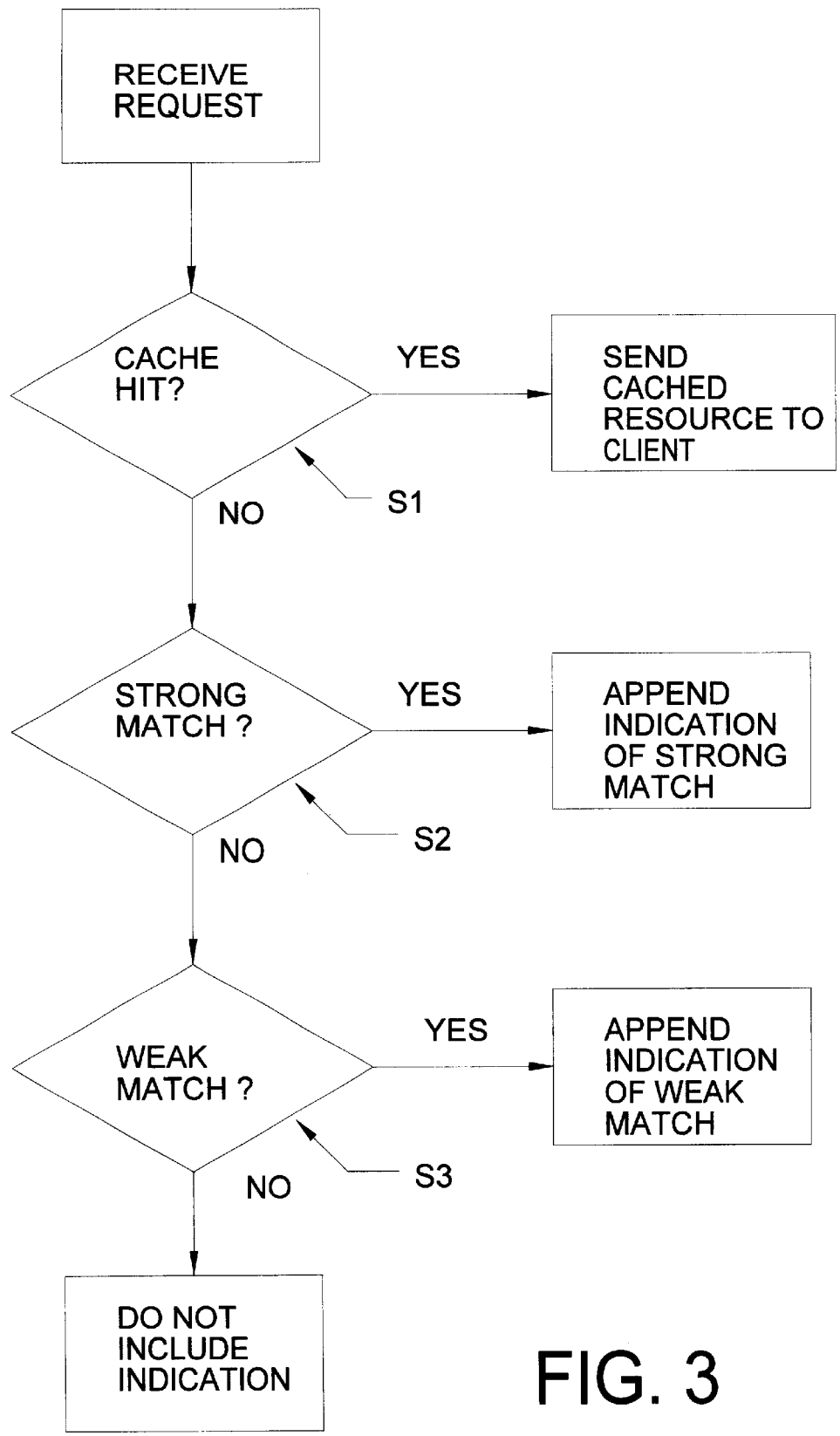
FIG. 3 is a flowchart illustrating one aspect of operation of a presently preferred method according to present invention.

The entry proxy 120 can operate in a known manner and check its cache for a fresh, valid (i.e., unexpired) stored resource which is an exact match (exact same URI) for the requested resource. If the entry proxy 120 has cached such a resource (a "cache hit"), the entry proxy can simply supply the cached resource to the user agent 20. The request is then considered satisfied, and it propagates no further. This is shown in the first decision box S1 in FIG. 3.

In a system 100 according to the invention, the entry proxy 120 then performs an additional check to see if it has an exact match for the resource being requested (called a "strong match" herein), which may or may not still be valid. If it does, it adds a header to the request indicating it has a possible strong match for the identity response and indicating which version of the response it has. This is shown in step S2 of FIG. 3. Then, if a downstream element knows the version is current, it can so advise the entry proxy. If the version is not current, the downstream element (return engine 130 in this example) can and preferably will use the outdated version as a reference document in the manner described herein.

In a system according to the invention, the proxy acting as the entry proxy 120, where there is no cache hit or possible strong match, checks for a "weak" match, that is, something which probably matches some if not all of the characteristics of the resource being requested. This is shown in step S3 of FIG. 3. In the presently preferred embodiment, this determination of a "weak" match is performed against a reference identity. The reference identity used for a given request may be an actual stored resource chosen as a reference heuristically. In the presently preferred embodiment, the reference is chosen based on a comparison of a concept URI (a version of the stored resource's original URI truncated at some defined point) against a truncated version of the URI of the requested resource in a manner described more fully below. In other words, the URI's are essentially compared and considered a weak match if they are the same up to the point a particular preselected character (such as a question mark or a comma) is encountered. It will also be understood that the reference identity may also be a resource created by the system manager explicitly for the purpose of serving as a resource for a given group of resources.

The ability to use near or weak matches with a reference document means that the system is able to exploit near-similarities to encode responses. Another consequence is that one reference can serve a plurality of resources, thus making it possible to use fewer references overall.

One of ordinary skill in the art will also readily appreciate that selection of a reference requires no *a priori* characterization of parts of the reference as dynamic or static. Deltas are prepared based on what has in fact changed, not on what can or may have changed.

If the entry proxy determines it has a weak match, then it sends the request on to the next proxy including a hop-to-hop defined header which indicates that the entry proxy 120 has determined the existence of a weak match (without indicating what reference it used to make the determination) as well as a header indicating the ability to perform delta encoding.

Assuming there are no intermediate proxies, the next element in the chain is the return engine 130. The return engine 130 is ideally located proximate the origin server 30 on which the resource being sought resides so the communications between the return engine 130 and the origin server 30 occur in a time which is essentially negligible as compared with the time required for communications over the network. "Proximate" in this context means preferably within the same facility.

The return engine 130 then executes a procedure similar to that executed by the entry proxy 120. First, the user agent 20 may have included a header in the request (such as IF NONE MATCH) indicating a resource it has cached. If the return engine 130 knows the resource cached by the user agent 20 is still valid, it simply sends the user agent 20 a message indicating that the user agent 20 is free to use the cached resource.

Figure 4:
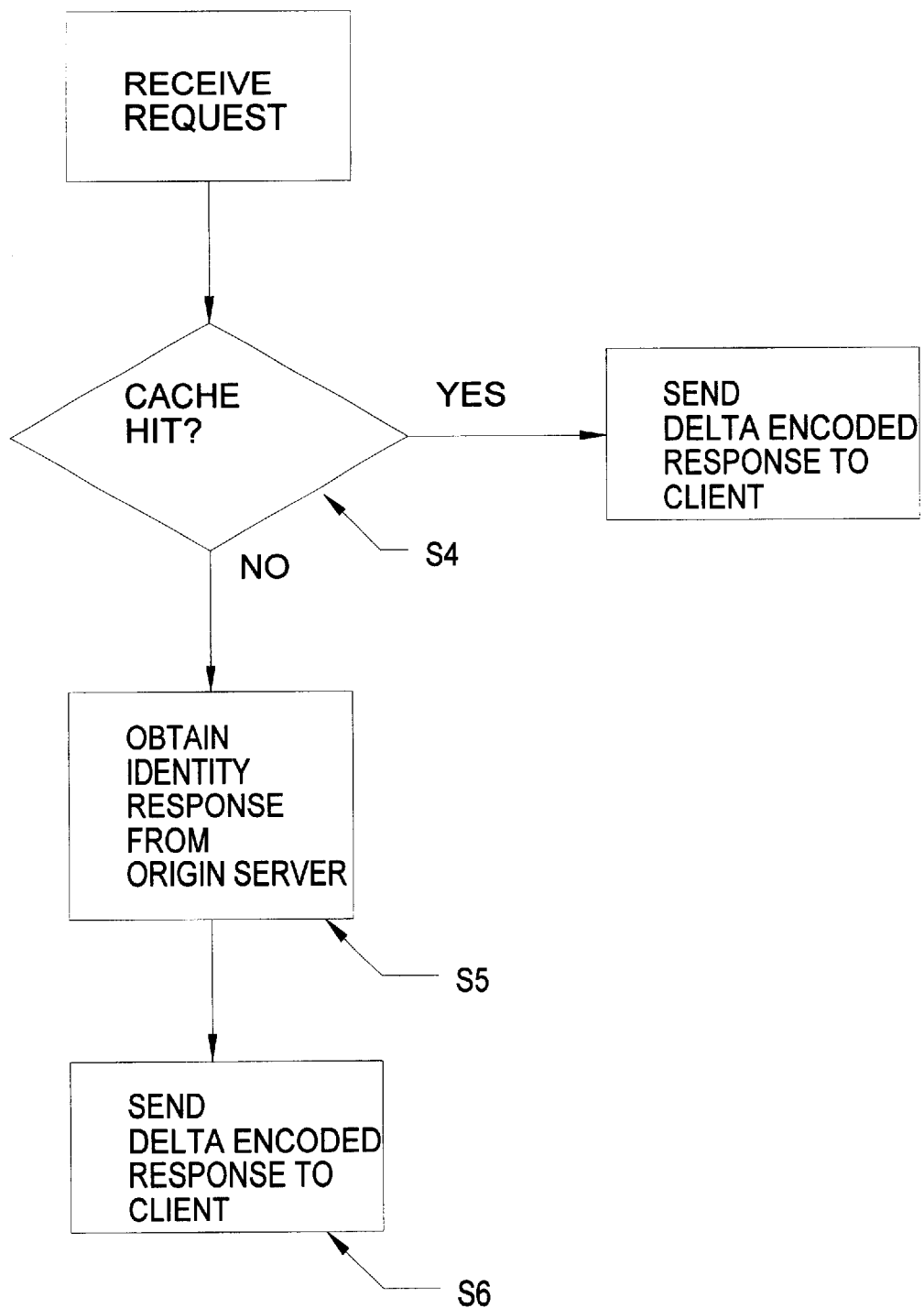
FIG. 4 is a flowchart illustrating another aspect of operation of a presently preferred method according to present invention.

The return engine 130 can also operate in a known manner and check its cache for a fresh, valid (i.e., unexpired) stored resource which is an exact match (exact same URI) for the requested resource. This is shown as step S6 in FIG. 4. If the return engine has cached such a resource, however, it does not simply supply the cached resource to the user agent 20 over the network. Instead, it performs a delta encoding between the requested resource and a reference resource to create a delta encoded response which is representative of the differences between the two. It then sends the delta encoded response and an identification of the resource used to create the delta back to the entry proxy 120. The reference resource in this instance is preferably the prior version which the entry proxy 120 has indicated it already has. The return engine may also include the address of the resource in its cache and then keep the reference available for a predetermined period of time intended to be sufficient for the entry proxy 120 to retrieve the reference if it does not still have it.

If the return engine does not already have the reference entity in its cache, it can simple retrieve the reference identity from the nearby origin server 30 and then perform the delta encoding. This is shown as step S5 in FIG. 4. It then sends the delta and an identification of the resource used to create the delta back to the entry proxy 120. The return engine may also include the address of the resource in its cache and then keep the reference available for a predetermined period of time intended to be sufficient for the entry proxy 120 to retrieve the reference if it does not already have it as shown in step S6 of FIG. 4.

Again, the ability to use near or weak matches with a reference document means that the system is able to exploit near-similarities to encode responses. Another consequence is that one reference can serve a plurality of resources, thus making it possible to use fewer resources.

If the entry proxy 120 has not indicated it has even a weak match, then the return engine 130 may elect to send the entire resource rather than just the delta. Alternatively, the entry proxy 120 can be configured to always indicate it has a weak match, regardless of whether it does or not. This may result in some overhead traffic, but, in some circumstances, this penalty may be more than offset by the potential for avoided traffic. This is because the return engine 130 may use as a reference a resource which the entry proxy 120 had cached but did not regard as being a reference. The return engine 130, generally speaking, selects its own references, independently of the choice made by the entry proxy 120. Thus, when the entry proxy 120 receives the delta and the identification of the reference, it may find that it already has the reference entity in its cache.

If there do happen to be intervening proxies in the system, they will perform operations, pair-wise, similar to those described above.

It will be apparent to one of ordinary skill in the art that the above process is transparent to the user agent 20 in the origin server 30. Elements in the system 100 in the process of relaying the request determine whether they have stored in their caches a "reference document" which can be used in facilitating a response to the request.

Proxies in the system 100 preferably have the ability to create reference entities asynchronously in real time. After a proxy serves an identity response, it caches the response and derives a "concept URI" for it. If then saves the concept URI if one does not already exist for that resource. This resource with its concept URI becomes the reference entity for the next requested resource which has a URI, for example, which matches the URI of the reference entity up to a certain position in the character string making up the URI. For example, comparison can be truncated at a question mark (typically separating a query string from the rest of the URI), or a comma, or at such other points as may be determined heuristically.

This reference will be used for all subsequent requested resources having matching truncated URI's until the performance of the reference degrades (the delta encoded responses become unacceptably larger) at which point the reference will be marked for substitution. Then, preferably, the next requested resource having a matching-as-truncated URI will be adopted as the new reference, and the supplanted reference will be marked for deletion.

It is preferable that a concept URI be made for every resource served by a proxy. The concept URI is stored, however, only if an acceptable concept URI does not already exist.

An example of a specific operation of a system according to the invention will now be explained starting with a system that is being used for the first time. That is, let it be supposed that the system 100 has never before been asked to respond to a request so that it is in a primitive state with empty caches. Also in this, suppose the request is for a quote is for the stock of a fictitious company called ABC Corp. from a given Internet stock quote service website. Let it also be supposed that the request calls for only two objects, those being a banner particular to the Internet stock quote service and the quote itself, and that the banner is a compressed image and the quote text is in HTML format.

Because the system has not previously been used, when the user agent 20 sends its request to the surrogate entry proxy 120, the entry proxy 120 will determine that it has nothing with which to facilitate transfer of the information sought in the request. Thus, the entry proxy 120 determines where to obtain the requested information based on its knowledge of the address of the return engine 130 associated with that resource. It then sends a message directed to that return engine without indicating the existence of even a weak match.

Any intervening proxy within the system 100 will also attempt to determine whether it has information which could facilitate responding to the request. As the system is in its initial state, each will determine that has no such information. Each proxy thus simply relays the request to the next proxy in the chain or ultimately to the return engine 130. The return engine also attempts to determine whether it has information which could facilitate response to the request. As it will not have any such information, it simply sends the request on to the origin server 30 and receives back from the origin server 30 the information called for in the request. In this embodiment, as far as the origin server 30 is concerned, the request has come directly from the user agent 20.

When the information responsive to the request is received by the return engine 130 from the origin server 30, the return engine 130 origin server sends the information back down the line to the entry proxy 120 and ultimately to the user agent 20. Of course, it will be understood by one of ordinary skill in the art that the return path for the response is the same, in terms of which proxies are used, as the path taken by the request. Once the transaction is served, however, the return engine 130 caches the content of the response as well as additional information ("metadata") which is about the response such as when it was generated and any expiration date associated with response. One element of this metadata is the concept URI for the resource, which is stored if no prior acceptable reference exists for that concept URI. As there is no previously stored reference in this example, the resource becomes the reference for this concept URI.

The entry proxy 120 preferably does the same thing, as does any proxy within the system 100 on the return path. Note that while the system according to the invention has not produced any advantage in this particular transaction, neither has any substantial penalty been incurred. The response with its concept URI becomes a reference for resources having URI's which, when truncated, match the concept URI.

Now suppose the user agent 20 generates another request for a quote from ABC Corp. at the same website. The user agent 20 again queries the system 100 for an address and the system 100 returns the address of the regional entry proxy 120. The user agent 20 then sends its request to the entry proxy 120. In the process of doing so, the user agent 20 may include information that it has cached a recent response for the same resource so that it has an earlier version of the same resource in its cache.

The entry proxy 120 then attempts to determine whether it is already in possession of information which may facilitate a response to the request. It may determine that the earlier version that the user agent 20 has cached is still valid. It may determine that it has a current version of the requested resource, which it can simply send to the user agent 20 (a "cache hit"). Assuming it has no version which it knows to be current, it can note that it has what may be a prior or current version of the same resource (a "strong match") and can send the request along with an indication of the existence of a potential strong match and with an identification of the potential strong match. This can be accomplished, for example, by using the "IF NO MATCH" header with the version number of the cached version of the resource. The entry proxy 120 also includes a hop-to-hop defined header (the "TE" header) which indicates the entry proxy's ability to perform a given type of transfer encoding.

When the return engine 130 receives the request, it too will note that it has already cached a page which is potentially useful to facilitate data transfer. It may know its cached version is current, or it may relay the request to the origin server 30 which returns either an indication that the previous response is still an acceptable response to that particular request (if the origin server 30 determines that a page cached by the return engine is still valid) or may be an identity response with a complete copy of the resource being requested. If the origin server 30 responds that the previous response is still acceptable, that information is simply sent back down the chain to the entry proxy 120 for eventual delivery to the user agent 20.

If, however, the origin server 30 sends the entire page, then the return engine 130 compares the page to the page it has previously stored in cache and has selected as a reference document and generates a response which includes two components. The first component represents the difference ("delta") between the reference document and the new page which, in this case, will be the stock price. The second component is an indication of the identity of reference document which the return engine 130 used to generate the delta as well as an indication of where the reference document may be found (in return engine's 130 cache) by the entry proxy 120 if the entry proxy 120 does not already have copy of it.

The entry proxy 120 receives the response from the return engine 130. If the entry proxy 120 already has a copy of the reference document against which the delta was prepared, the entry proxy 120 reconstitutes the message (identity response) using the delta and the reference document and sends the reconstituted message to the user agent 20. In this way, much less data needs to be sent between the return engine 130 and the entry proxy 120. If the entry proxy 120 does not already have a copy of the reference document against which the return engine 130 prepared the delta, the entry proxy 120 simply uses the address information which the return engine 130 placed in the message to fetch the reference document. It then uses the reference document it has fetched to reconstitute the message which it then passes along to the user agent 20.

Note that the entry proxy 120 has the ability to "advise" the return engine 130 that it has already cached a candidate reference document. The proxy acting as the return engine 130, however, alone determines what will be used as a reference document. In the case of a strong match as occurs here, however, it is preferable that the return engine 130 use the prior version of the same resource as the reference.

Now suppose that the user agent 20 seeks to request a quote from the same Internet stock quote resource but for different company, say, a fictitious DEF Corp. The proxy acting as the entry proxy 120, when it receives the request, will note that it has previously processed a request from the same site but for a different company. Based on various heuristics (such as front-end matched URI's), however, the entry proxy 120 may determine that although what it has already cached is not an exact match for the information being requested, it may be close enough so that a delta between its candidate reference document and a complete fresh response will be significantly shorter than the complete response itself. Under such circumstances, the entry proxy 120 will send an indication that it has a "weak match" without indicating the identity of the candidate reference document it would use. The return engine 130 would then operate as indicated above. It is only when neither the entry proxy 120 nor any intervening proxy within the system 100 including the proxy acting as the return engine 130 fails to indicate the existence of a strong match or a possible weak match that the return engine sends the entire new document as the response rather than a response in the form of the delta and the identity and location of the reference document which it used to generate the delta.

As mentioned, it may be desirable in some circumstances to configure the entry proxy 120 so that it always indicates the existence of at least a weak match. While in some instances this may force the entry proxy 120 to fetch a reference document, in some types of traffic this may be more than counterbalanced by the increased efficiency obtained when the entry proxy 120 in fact has a suitable reference document already in its cache.

Another aspect of the system is that elements in the system 100 can keep track of how well a given reference document performs against certain kinds of requests. In the example given above, the ABC quote will be used as the reference document for the DEF quote as it is the only choice. It will be continue to be used as the preferred reference (be the concept URI) for quotes from that service as long as it "performs well." By "performs well" is meant that the delta created by comparing the DEF quote against the ABC quote with the ABC quote as a reference is small compared to the size of the quote overall. If, however, over time the performance of the ABC quote as a reference starts to degrade (larger deltas start to be generated), then the system will abandon the ABC quote as a reference by marking it for substitution with a more appropriate reference for the next transaction invoking the reference. It will then adopt another reference instead.

The determination of when a reference should be abandoned and what new reference should be used in its stead can be based on any of a number of factors or combination of them. For example, the deltas generated using a given reference document can be tracked statistically and the reference document can be abandoned when more than an acceptable number of deltas generated using a reference fall more than a predetermined number of standard deviations from the mean of the statistical distribution of deltas generated using that reference. Moreover, the new reference can be adopted using a similar scheme. It is presently preferred, however, simply to use the most recent version of the resource with the same concept URI as this is the most likely to incorporate changes which have been introduced over time. Of course, one of ordinary skill in the art will be able to determine what scheme works best for an anticipated type of message traffic.

In a presently preferred embodiment, the trigger for marking a reference for substitution (the "switchpoint") is determined using a set of moving averages as defined below:

Switchpoint Metric Collection ma_fast-->EMA (0.85) of time-series delta sizes
ma_slow-->EMA (0.97) of time-series delta sizes
ma_orig-->EMA (0.995) of time-series delta sizes
ma_diff-->EMA (0.85) of ma_fast_ma_slow Each EMA (exponential moving average) is a weighted average of prior samples where each sample is the size of a delta generated from the associated reference entity. The exception is ma_diff where a sample is difference between two of the other averages. The coefficients indicate the weighting. For example, for ma_fast, the weighted average of the previous values gets multiplied by 0.85 and the most recent value gets multiplied by 0.15 to give a time-weighted average which is very sensitive to recent values. Ma slow is much less sensitive to more recent values. The lower the coefficient (0.85, 0.95, and 0.995 respectively) the faster the average adapts to new input.

It is presently preferred that switchpoint detection occur according to the following method:

Switchpoint Detection 1) ma_fast−ma_slow>2*ma_diff-or-
2) ma_fast>2*ma_orig

When the gap between fast and slow averages exceeds a certain size (twice that of the normal gap, or when the fast line is twice as big as the slowest moving average (ma_orig) replacement is initiated. Replacement can be aborted if the actual deltas are still very small. For instance a ma_fast of 400 compared to a ma_orig of 30 would normally cause replacement on a ratio basis, but a 400 byte delta is still so small, replacement is not warranted and so is not initiated.

It is presently preferred to use 600 bytes is the minimum threshold for substitution.

The above example uses multiple quotes from the same resource, but it is also possible that the same reference could be used, for example, for other quotes called from other URI's. The reference document can be the same as a resource document, or it can be a reference created by the system for a particular class of requests which does not correspond to any document which has any meaning outside of the system 100.

The ability of the system 100 to generate deltas using reference documents which can serve multiple resources makes it possible to send shorter messages but without undue proliferation of "exact match" reference pages. Thus, the caches of the proxy acting as the entry proxy 120, of the proxy acting as the return engine 130, and of intervening proxies, if any, will not be flooded with reference pages. This avoids the "fan out" problem which would be inherent in a system which required exact matches.

It will also be appreciated by one of ordinary skill in the art that the system as described above has the capacity to operate "hop-to-hop" rather than simply end-to-end. Another advantage of the above system is that it is transparent to the user agent 20 and the origin server 30. In other words, neither the user agent 20 nor the origin server 30 needs to know anything about the unique aspects of the operation of the system 100. The user agent 20 simply sends its request as it would to any system and the origin server 30 simply sends its response as it would to any system.

In another embodiment, it is possible to combine the functions of the return engine 130 into the origin server 30. This may have advantages in connection with certain types of message traffic in that the origin server itself could create an reference document optimized for the content found on the server, but it would lose the benefit that neither the user agent nor the origin server would have to be modified to work with the system.

The entire system can be implemented using headers which are a part of HTTP or which are permitted under HTTP. Examples of such headers are given below. Upon receiving a message and determining a cache miss, the proxy acting as the entry proxy 120 adds a hop-to-hop defined header (the "TE" header) with a tag indicating what types of transfer encodings the entry proxy is capable of decoding. In a system according to the invention, the tag will indicate the ability to perform delta encodings as described herein.

One of ordinary skill in the art will appreciate that any one of a number of delta formats could be used. One possibility is the VCDIFF compression format. See Korn, David and Vo, Kiem-Phong, "The VCDIFF Generic Differencing and Compression Data Format" Work in Progress IETF Draft. Another format can be generated using the UNIX DIFF utility and decoded using the PATCH utility.

The presently preferred delta document format, however, is designed to provide a compact representation of the differences between two resources independent of the MIME type of those resources. It is a binary format with very low overhead. The differential encoding used is based on a string substitution which uses of the reference entity as a dictionary for the encoded output using only variable length references to strings in the reference document and raw echo includes of non-replicated information from the entity being encoded. The algorithm implementation operates in fixed memory resources in time linearly proportional to the document size. Because the resource requirements do not vary with the size or complexity of the document, the algorithm has determinable bounds that make a suitable for high volume transaction environments.

An additional design goal of the delta is that the encoding can be removed in time linearly proportional to the size of the identity encoding, and that the encoding can be created in fixed space and linear time.

The format consists of a stream of functions and their associated data. It is presently preferred to use six different functions. A function consists of an operation code and an operation code defined amount of data. The function, taken as a whole, defines the amount of data associated with it.

For the presently preferred encoding, the bytestream has the following meaning: a 1 byte code, followed by a code dependent number of arguments (the arguments with the code form a function), followed by a function defined amount of input to the function.

Opcode 0×FA is the copy operator. It takes two numeric arguments, offset and len, respectively. To create output the function copies len bytes of input from the reference starting at offset bytes from the beginning of the reference. It copies this to the output.

Opcode 0×FB is the echo operator. It takes one numeric argument, namely, len. To create output copy, Opcode takes len bytes of input from the delta bytestream starting at the byte immediately following the last byte of the len argument. It copies this data onto the output as literals.

Opcode 0×FC is the store operator. It is like the echo argument, except the amount of data specified by its one numeric argument should simply be skipped and left uninterpreted rather than copied to the output. This data can be referenced by the local-copy operator.

Opcode 0×FD is the local-copy operator. It takes two arguments: offset and ten just like the copy operator. For this function the data is taken from the delta file, not from the dictionary (reference) file. It has two purposes: it allows a compression-like scheme where, when non-dictionary data is included redundantly in the delta, it can be reduced to a reference. Also, it can be useful in dynamically generated deltas over networks where bytes used can be traded for total end-to-end latency. The offset must be a point in the document previous to, and wholly contained within, 16 KB of the opcode.

Opcode 0×FE is the reference checksum operator. Following this opcode are 4 bytes that represent a CRC-32 checksum of the reference document against which this delta is expected to be applied. As deltas do not have to be applied to exactly one reference document, the appearance of this code is not required in a valid a-delta file.

Other opcodes less than 0×FA are implicit length 1 echoes. They copy the opcode itself to the output and consider the next byte as a new opcode . . . 0×FE and 0×FF are reserved at this time.

Numeric values in the delta stream are of variable length and are always integers. Each integer is stored in the byte stream MSB (Most Significant Bits First). Each 8 bit byte in the output streams contains 7 bits of the data to be stored and the high bit indicates if another output byte is required. Thus, decimal 255 would be stored as 0×817F and decimal 284 would be stored as 0×821C.

Some examples of numeric encoding for such a delta format follow:

| Decimal | Hex | Hex Encoding |
|---|---|---|
| 255 | FF | 817F |
| 284 | 011C | 821C |

-continued

| Decimal | Hex | Hex Encoding |
|---------|------|--------------|
| 66      | 42   | 42           |
| 19174   | 4AE6 | 819566       |

Again, it will be readily apparent to one of ordinary skill in the art that other delta formats may be used, and the invention is not limited to the use of any particular encoding scheme.

While the differential formats are not defined explicitly by RFC 2616, that standard does explicitly provide the framework for negotiating and applying this new content type in a 100% inter-operable and open standards fashion. By publishing the details of the encoding format other implementations of the algorithms should be able to interact seamlessly without regard to vendor and any web element implementations without differential support will still operate at their normal efficiency.

Differential encodings generate a representation that contains only the differences between the encoded entity and another reference entity. In the case that the reference entity does not need to be transferred over the wire this can result in substantial byte count reductions if the two entities are similar.

As alluded to above, HTTP/1.1 defines a certain subset of conditional requests that can be used for cache validation. These requests contain an IF NONE MATCH and/or an IF MODIFIED SINCE clause. Under traditional operation either of these clauses is satisfied by the resource being requested then the server may return a 304 (not modified) response with a zero byte body. Such a response indicates the client may substitute its stored copy that was referenced by the conditional clause in place of the empty server response. This avoids transferring a document that has not changed in between requests while still verifying the document's freshness. In cases where the requested resource does not satisfy the conditional clauses the server has traditionally returned the entire new resource with a 200 or similar response code.

However, in cases where the client has provided a IF NONE MATCH and/or an IF MODIFIED SINCE clause it has also provided a hint as to what previous revisions of the requested entity it already has stored locally. This expired entity becomes a candidate for use as a differential reference entity if the server still has a copy of it because it satisfies the requirement that the client does not need to transfer the reference document to undo the encoding that would be applied to the current fresh resource for transport. Because the revision of the reference entity used simply serves as a dictionary to create the identity response to the request, it need not satisfy the normal rules of having current data. Instead it must simply be uniquely identifiable from some point in time.

Obviously, only a similar pair of entities can be represented by a small differential. This scheme of determining reference entities operates on the heuristic principle that changes to a resource are incremental in nature and are not "complete overhauls". Web page counters, time stamped footers, references to advertisements, typo corrections, and rotation of banner images that are designed to give a page a fresh feeling are all examples of common small incremental modifications on otherwise static pages.

Truly dynamic pages provide an even more fertile environment for delta encodings. Because of the programmatic nature of creating these documents dynamically every revision of them typically maintains the same look and feel with only a proportionally small amount of content being changing based on input conditions. The typical text oriented web document is about 14 KB, with dynamic documents being just a small amount larger.

Returning to the example of two consecutive requests to a stock quote ticker separated in time (say, by 5 minutes or so), clearly financial data is dynamic material and the up-to-the moment current stock price and supporting data must constitute the response to the second request. However, the only differences between the second response and the first one are a handful of bytes representing perhaps the new price, the time of the last trade, and the effective time of the new quote. All of the supporting page data which includes all the formatting codes, the stock name and background information, and any look and feel JavaScript remain unchanged over short intervals.

The modified portions thus may represent a tiny fraction of the total byte count of the identity response. The HTML formatting information has not changed, the text describing what the company is and what it does has likely not changed, nor in that short time frame have links to analysts or other news coverage changed. As long as the client still has a copy of the old response the server can essentially send an encoding instructing the client to use the previously formatted copy but with a new price.

This concept extends to most dynamic material. News sites, such as msbnc.com and cnn.com provide news indexes to the day's headlines. As new stories come on, the old ones fall off maintaining a constant amount of material on the page. As a change happens, a response that contains just the new information and the information of which story to remove provides a much more compact representation than the identity encoding of the entity. This can be a significant savings with a site such as CNN that has a 77 KB text home page but each story is only one or 2 KB by themselves.

Delta encodings also facilitate the creation of larger and more intricate pages because the latency cost of interpreting them for the user becomes a one time capital cost instead of an ongoing determent. This can facilitate a reasonable response time in a whole new type of human interface environment, while still maintaining the dynamic properties of the resource.

Other database driven sites such as multiple job search applications, newspaper archives, e-commerce shopping catalogs, and HTTP based message boards show significant redundancy between different entities. Optimal reference entities in these sites may be previous versions of the same resource or they may be other resources within the server. Thus, the reference entity can be a different resource than the identity response.

For example, in a HTML based BBS (or mailing list gateway) a single resource of the form http://www.xxx.com/ml-gw/1999/june/04/005.html is unlikely to ever change, and thus subsequent requests for it are not in need of a delta encoding because they can be satisfied with 304 code responses if the client maintains an old copy. However, http://www.xxx.com/ml-gw/1999/june/04/006.html is likely to be substantially similar in layout to 005.html with almost all of the framing and markup repeated because it is automatically generated.

Because of this, 005.html would make a good reference entity for a client who has already read and stored a copy of it and is now reading the next message: 006.html. Online catalogs show a similar property. In the catalogs different resources may display different products but a large portion of the document size is devoted to "look and feel" features of the display. Any other application that finds the user paging through lists of data is likely to display a similar characteristic.

When a large number of resources are self similar a system such as that provided for in the present invention yields an advantage in two ways. First, the proxy is not required to keep multiple variants of different resource versions for every member of the self similar set. It is sufficient to store only the reference entity. Second, the proxy need not have had previous interaction with the requested resource in order to make use of differential encoding against a hinted reference resource. This eliminates the need for cache seasoning to achieve better results.

As mentioned above, determining self similarity (or determining the closest representation of a reference resource for a set of documents) is presently accomplished using heuristics to select a document from among a set of documents that have a look and feel similar to the rest. Pages within dynamically generated sites tend to have a tremendous amount of similar layout and scripting content in them, with only a few bytes changing depending on the input criteria. Examples of this include shopping sites like Amazon.com where each book page is similar to the last one on a macro scale, with only the actual names and descriptions changed. Message board chat systems, like those found on Yahoo!, have a very similar property where each message is laid out in the same fashion and the only difference (and thus the only thing that should be transferred when reading more than one message) is the content provided by the poster. Thus, one scheme to identify self-similarity is to do comparisons of URI's truncated at some character such as an asterisk or a question mark. This will typically cause an indication of a match for documents originating from the same website, where all of the documents are more likely to have the same look and feel.

The proxies used in a system implementing the invention define three message headers in addition to those defined in RFC 2616. The first is has a syntax which may be defined as follows:

Header Label1: [absoluteURI| "self"] etag

"Header Label1" is simply some arbitrary name to be given this header. This first message header must be included in any message that contains a delta transfer encoding. The header defines the dictionary, or reference, resource for the differential encoding. It is composed of the URI of the reference resource and the etag for it, specifying the exact version of the entity in question. Only the exact entity may be used as the reference resource for undoing an encoding associated with this message. In the common case that the reference entity for the encoded message is another revision of the same URI to which the transaction pertains. the keyword self may be substituted for the URI in order to conserve header size.

This header is defined hop-to-hop and must not be propagated by a proxy if received from upstream (unless the encoding is acceptable to the downstream client and is left intact by decision of the proxy). Additionally, all hop-to-hop headers must be enumerated in the Connection header of any message.

The second additional header has a syntax is defined as follows:

Header Label2: [absolute URI| "self"] etag

This header is the content encoding equivalent of first header. It must be included with any message that has had a delta content encoding applied to it in order to identify the reference entity that the user-agent will use to decode the message.

As content-encodings are defined end-to-end, so is this message header. A proxy may not modify or introduce it into the transaction chain.

The third additional header is has the syntax:

Header Label3: absoluteURI etag

This header is an end-to-end informational header. A proxy may not modify it if it is present, but it may introduce it if it is not present and it has reason to believe from an out-of-band source that it is aware of a reasonable value for the header.

The header indicates to any other network elements in the transaction scheme the name and location of a document that it is believed would provide a similar resource to the one being transferred. These other elements may chose to use that resource as a reference entity if a differential transfer encoding can be created at that hop.

This header has potential usefulness because, based solely on the request, the server has no convenient way to correlate a reference entity to the identity entity that is being used to create a response when the reference entity candidate is not also another version of the URI. The intuitive meaning of this header is to have the server which understands the relationship between resources provide a specific version of a URI that contains a good reference entity for the response. It is defined end-to-end and the URI need not be the same as the requested URI. Because of the end-to-end properties of the header, if it is present any intermediary proxies may not alter it during forwarding but they may add it to a response if it is not already part of the response. If a proxy has reason to believe it knows of a good reference entity by way of external configuration this is a good strategy.

Another advantage of defining this header end-to-end is that it is propagated across hops that may not be able to understand delta encodings. While those hops will not benefit from the encoding's byte potential size reduction the hint itself survives that hop and provides the necessary information for the next hop to apply the hint if it is capable of doing this scheme.

A potential downside of using hints is that the task of determining whether or not the client possesses the reference entity suggested by the hint is much more state intensive. Doing so may be so state intensive as to be prohibitively expensive, especially considering the low costs involved of the client obtaining the reference entity if it does not already have a copy. This tradeoff makes sense in an environment where you expect there to be multiple requests for a series of different resources all related by the same reference entity, such as a catalog or message board where single page views are very rare.

Hints may either be received from upstream or may be assigned at the proxy itself (if not already present) through an API. If no hint is present the proxy will use any entity listed in the IF NONE MATCH header of the request as a reference candidate if that entity is also present in the proxy's cache. The reference candidate need not be considered fresh. The IF MODIFIED SINCE header does not provide a precise indication of what entities are possessed by the client because it is based on a time stamp with a one second granularity, and provides no way to separate between two variants of the same resource constructed on the same second. All requests made by the proxy include an IF NONE MATCH header indicating what versions are in its cache and all responses from the proxy add an etag to them, based on a checksum, if one is not present.

If a reference candidate has been identified the proxy optionally screens it for content type and then calculates a delta for it. Creating deltas on binary formats is of questionable usefulness as small changes in semantic content can result in large changes in the byte representation of the entity. Some types of gifs, for instance, react well to this scheme and some do not. Additionally, it is questionable whether graphical content changes in an incremental fashion even at a logical level, much less a byte representation level. It will be apparent to one of ordinary skill in the art that different delta formats will yield different results for different contents.

As a final check, if the delta between the two objects which is greater than the size of the identity object the encoding may be discarded. However, this is not necessary for the operation of the system. In the worst case, those situations where the two entities share no commonalties, the encoded version is just six bytes greater than the identity version. Therefore if an implementation chose to stream the output, which creates a situation in which the final check cannot be performed, the total output will never substantially harm the transfer performance.

The foregoing describes the invention in terms of specific embodiments for the purposes of elucidation only. It is not limited to those specific embodiments. One of ordinary skill in the art will readily appreciate that variations not described above are possible without departing from the essential spirit of the invention. The invention should therefore be regarded as being fully commensurate in scope with the following claims.

I claim:

1. A method of retrieving data over a content distribution network, said method comprising:

a step, performed by a client, of sending a request for data for a resource, a step, performed by a server responsively connected to said client, of receiving said request for data sent by said client;

a step, performed by said server, of identifying a reference for an identity response to said request;

a step, performed by said server, of comparing said reference with said identity response to said request for data to generate a delta encoded response based on differences between said identity response and said reference;

a step, performed by said server, of sending said delta encoded response and an identification of said reference to said client;

a step, performed by said client, of reconstituting said identity response using said delta encoded response and a locally stored copy of said reference if said client has previously stored a copy of said reference, otherwise retrieving a copy of said reference and then reconstituting said identity response using said delta encoded response and the retrieved copy of said reference; and a step, performed by said server, of tracking use of said reference and replacing said reference when more than a predetermined number of delta encoded responses generated using said reference fall more than a predetermined number of standard deviations from a mean of a distribution of delta encoded responses generated using said reference.

2. A method as claimed in claim 1 wherein said step of identifying a reference for the identity response comprises the step of identifying a reference having a URI which when truncated matches a similarly truncated URI for the identity response.

3. A method as claimed in claim 1 wherein said step of tracking further comprises the steps, performed by said server, of:

storing an indication of a size of said delta encoded response generated by a given reference each time said comparing step is performed using said given reference to obtain a series of sizes of delta encoded responses generated by said given reference;

forming at least one weighted average using said series of sizes of delta encoded responses; and substituting a new reference for the given reference based at least in part on said at least one weighted average.

4. The method as claimed in claim 3, wherein said step of forming at least one weighted average using said series of delta encoded responses further comprises the steps of:

forming a fast moving average using said series of sizes of delta encoded responses; and forming a slow moving average using said series of sizes of delta encoded responses, wherein said fast moving average weights a size of a most recent delta encoded response more than said slow moving average weights said size of said most recent delta encoded response.

5. The method of claim 4, wherein said step of replacing said reference when more than a predetermined number of delta encoded responses generated using said reference fall more than a predetermined number of standard deviations from a mean of a distribution of delta encoded responses generated using said reference further comprises the step of:

replacing said reference when a difference between said fast moving average and said slow moving average is greater than twice a weighted average of said difference between said fast moving average and said slow moving average.

6. The method of claim 4 wherein said step of replacing said reference when more than a predetermined number of delta encoded responses generated using said reference fall more than a predetermined number of standard deviations from a mean of a distribution of delta encoded responses generated using said reference further comprises the step of:

replacing said reference when said fast moving average is greater than twice said slow moving average.

7. A method as claimed in claim 1 wherein said delta encoded response is generated based on a string substitution using the reference as a dictionary for the delta encoded output and using variable length references to strings in the reference and raw echo includes of non-replicated information from the identity response.

8. A method as claimed in claim 1 wherein in said step of sending said delta encoded response and an identification of said reference to said client, said server also sends an address where said reference may be found and wherein said server keeps said reference available for a predetermined period of time after sending said identification of said reference and said address to said client.

9. A method as claimed in claim 1, wherein said step of identifying a reference for said identity response further comprises the step of:

selecting, as said reference, a document used to compute deltas relative to said identity response, wherein said identity response represents an original content document associated with said client's request.

10. The method as claimed in claim 1, further comprising the step of:

a step, performed by said network, of returning an address of a proxy to said client.

11. The method of claim 1, further comprising the step of:

aborting said replacement of said reference if a size value associated an average of recent delta encoded responses is less than a predetermined threshold.

12. A method of retrieving data over a content distribution network, said method comprising:
- a step, performed by a server after serving a resource in a previous transaction, of making a concept URI for that resource;
- a step, performed by a client, of sending a request for data for a resource to said server,
- a step, performed by said server, of receiving said request for data sent by said client;
- a step, performed by said server, of comparing said concept URI with the URI of an identity response to said request for data and, if said concept URI and said URI of said identity response partially match, of generating a delta encoded response based on differences between said identity response and a reference identified by said concept URI;
- a step, performed by said server, of sending said delta encoded response and a identification of said reference to said client;
- a step, performed by said client, of reconstituting said identity response using said delta encoded response and a locally stored copy of said reference if said client has previously stored a copy of said reference, otherwise retrieving a copy of said reference and then reconstituting said identity response using said delta encoded response and the retrieved copy of said reference; and
- a step, performed by said server, of tracking use of said reference and replacing said reference when more than a predetermined number of delta encoded responses generated using said reference fall more than a predetermined number of standard deviations from a mean of a distribution of delta encoded responses generated using said reference.

13. A method as claimed in claim 12, wherein said step of comparing said concept URI and said URI of said identity response comprises comparing truncated versions of said concept URI and said URI of said identity response for a complete match.

14. A method as claimed in claim 12, wherein said step of tracking further comprises the steps, performed by said server, of:
- storing an indication of a size of said delta encoded response generated by a given reference each time said comparing step is performed using said given reference to obtain a series of sizes of delta encoded responses generated by said given reference;
- forming at least one weighted average using said series of sizes of delta encoded responses; and
- substituting a new reference for the given reference based at least in part on said at least one weighted average.

15. A method as claimed in claim 12, wherein said delta encoded response is generated based on a string substitution using the reference as a dictionary for the delta encoded output and using variable length references to strings in the reference and raw echo includes of non-replicated information from the identity response.

16. A method as claimed in claim 12 wherein in said step of sending said delta encoded response and an identification of said reference to said client, said server also sends an address where said reference may be found and wherein said server keeps said reference available for a predetermined period of time after sending said identification of said reference and said address to said client.

17. A method as claimed in claim 12 wherein said step of tracking further comprises the steps, performed by said return engine, of:
- storing an indication of a size of said delta encoded response generated by a given reference each time said comparing step is performed using said given reference to obtain a series of sizes of delta encoded responses generated by said given reference;
- forming at least one weighted average using said series of sizes of delta encoded responses; and
- substituting a new reference for the given reference based at least in part on said at least one weighted average.

18. The method as claimed in claim 12, further comprising the step of:
- a step, performed by said network, of returning an address of a proxy to said client.

19. A method of retrieving data over a content distribution network, said method comprising:
- a step, performed by a user agent, of sending a request for data for a resource,
- a step, performed by an entry proxy arranged to receive said request from said user agent, of relaying said request to a return engine together with an indication that said entry proxy can perform an encoding;
- a step, performed by said return engine, of obtaining an identity response to said request from an origin server;
- a step, performed by said return engine, of identifying a reference for said identity response to said request;
- a step, performed by said return engine, of comparing said reference with said identity response to said request for data to generate a delta encoded response based on differences between said identity response and said reference;
- a step, performed by said return engine, of sending said delta encoded response and an identification of said reference to entry proxy;
- a step, performed by said entry proxy, of reconstituting said identity response using said delta encoded response and a locally stored copy of said reference if said entry proxy has previously stored a copy of said reference, otherwise retrieving a copy of said reference from said return engine and then reconstituting said identity response using said delta encoded response and the retrieved copy of said reference;
- a step, performed by said entry proxy, of sending the reconstituted response to the user agent which requested it; and
- a step, performed by said return engine, of tracking use of said reference and replacing said reference when more than a predetermined number of delta encoded responses generated using said reference fall more than a predetermined number of standard deviations from a mean of a distribution of delta encoded responses generated using said reference.

20. A method as claimed in claim 19 wherein said step of identifying a reference for the identity response comprises the step of identifying a reference having a URI which when truncated matches a similarly truncated URI for the identity response.

21. A method as claimed 19 in claim wherein said delta encoded response is generated based on a string substitution using the reference as a dictionary for the delta encoded response and using variable length references to strings in the reference and raw echo includes of non-replicated information from the identity response.

22. A method as claimed in claim 19 wherein in said step of sending said delta encoded response and an identification of said reference to said entry proxy said return engine also sends an address where said entry proxy may find said reference and wherein said return engine keeps said reference available for a predetermined period of time after sending said identification of said reference and said address to said entry proxy.

23. The method as claimed in claim 19, wherein said step of identifying a reference for said identity response further comprises the step of:

selecting, as said reference, a document used to compute deltas relative to said identity response, wherein said identity response represents an original content document associated with said client's request.

24. The method as claimed in claim 19, further comprising the step of:

a step, performed by said network, of sending an address of said entry proxy to said user agent.

25. An apparatus for retrieving data over a content distribution network, said apparatus comprising:

a client adapted to send a request for data for a resource, a server, responsively connected to said client, and arranged to receive said request for data sent by said client, said server including means for identifying a reference for an identity response to said request;

means for comparing said reference with an identity response to said request for data to generate a delta encoded response based on differences between said identity response and said reference;

means for sending said delta encoded response and an identification of said reference to said client; and means for tracking use of said reference and replacing said reference when more than a predetermined number of delta encoded responses generated using said reference fall more than a predetermined number of standard deviations from a mean of a distribution of delta encoded responses generated using said reference;

wherein said client includes means for reconstituting said identity response using said delta encoded response and a locally stored copy of said reference if said client has previously stored a copy of said reference, otherwise for retrieving a copy of said reference and then reconstituting said identity response using said delta encoded response and the retrieved copy of said reference.

26. Apparatus as claimed in claim 25 wherein said reference identifying means includes means for identifying a reference having a URI which when truncated matches a similarly truncated URI for the identity response.

27. Apparatus as claimed in claim 25 wherein said means for tracking further comprises:

means for storing an indication of a size of said delta encoded response generated by a given reference each time said comparing step is performed using said given reference to obtain a series of sizes of delta encoded responses generated by said given reference;

means for forming at least one weighted aver age using said series of sizes of delta encoded responses; and means for substituting a new reference for the given reference based at least in part on said at least one weighted average.

28. The apparatus as claimed in claim 27, wherein said means for forming at least one weighted average using said series of delta encoded responses further comprises:

means for forming a fast moving average using said series of sizes of delta encoded responses; and means for forming a slow moving average using said series of sizes of delta encoded responses, wherein said fast moving average weights a size of a most recent delta encoded response more than said slow moving average weights said size of said most recent delta encoded response.

29. The apparatus of claim 28, wherein said means for replacing said reference when more than a predetermined number of delta encoded responses generated using said reference fall more than a predetermined number of standard deviations from a mean of a distribution of delta encoded responses generated using said reference further comprises:

means for replacing said reference when a difference between said fast moving average and said slow moving average is greater than twice a weighted average of said difference between said fast moving average and said slow moving average.

30. The apparatus of claim 28 wherein said step of means for replacing said reference when more than a predetermined number of delta encoded responses generated using said reference fall more than a predetermined number of standard deviations from a mean of a distribution of delta encoded responses generated using said reference further comprises:

means for replacing said reference when said fast moving average is greater than twice said slow moving average.

31. Apparatus as claimed in claim 25 wherein said delta encoded response is generated based on a string substitution using the reference as a dictionary for the delta encoded output and using variable length references to strings in the reference and raw echo includes of non-replicated information from the identity response.

32. Apparatus as claimed in claim 25 wherein said means for sending said delta encoded response and an identification of said reference to said client further includes means for sending an address where said reference may be found and wherein means for keeping said reference available for a predetermined period of time after sending said identification of said reference and said address to said client.

33. Apparatus as claimed in claim 25, wherein said means for identifying a reference for an identity response further comprises:

means for selecting, as said reference, a document used to compute deltas relative to said identity response, wherein said identity response represents an original content document associated with said client's request.

34. The apparatus as claimed in claim 25, wherein said client connects to a proxy located on machine other than that on which said client is located.

35. The apparatus of claim 25, further comprising:

means for aborting said replacement of said reference if a size value associated an average of recent delta encoded responses is less than a predetermined threshold.

* * * * *